(12) United States Patent
Ulrich et al.

(10) Patent No.: US 9,450,791 B2
(45) Date of Patent: Sep. 20, 2016

(54) CIRCUITS FOR EFFICIENT DETECTION OF VECTOR SIGNALING CODES FOR CHIP-TO-CHIP COMMUNICATION

(71) Applicant: Kandou Labs, S.A., Lausanne (CH)

(72) Inventors: Roger Ulrich, Bern (CH); Peter Hunt, Northampton (GB)

(73) Assignee: KANDOUB LAB, S.A. (CH)

( * ) Notice: Subject to any disclaimer, the term of this patent is extended or adjusted under 35 U.S.C. 154(b) by 0 days.

(21) Appl. No.: 15/070,911

(22) Filed: Mar. 15, 2016

(65) Prior Publication Data

US 2016/0197747 A1 Jul. 7, 2016

Related U.S. Application Data

(63) Continuation of application No. 13/895,206, filed on May 15, 2013, now Pat. No. 9,288,082.

(51) Int. Cl.
*H04L 27/06* (2006.01)
*H04L 27/00* (2006.01)
(Continued)

(52) U.S. Cl.
CPC ......... *H04L 25/08* (2013.01); *H04L 25/03006* (2013.01); *H04L 2025/03363* (2013.01); *H04L 2025/03789* (2013.01)

(58) Field of Classification Search
USPC ........... 330/252, 255, 278, 288, 307, 51, 54,
330/69, 72, 98, 85, 108; 375/219, 220, 222,
375/240.26–240.27, 240.23, 240.24, 240.1,
375/240.11, 259, 285, 284, 278, 260, 295,
375/296, 297, 299, 316, 318, 317, 324, 326,
375/339, 340, 346, 347
See application file for complete search history.

(56) References Cited

U.S. PATENT DOCUMENTS 3,196,351 A 7/1965 Slepian
3,636,463 A 1/1972 Ongkiehong
(Continued)

FOREIGN PATENT DOCUMENTS

CN 101478286 7/2009
EP 2039221 2/2013
(Continued)

OTHER PUBLICATIONS

Abbasfar, A., "Generalized Differentialyyyyyy Vector Signaling", IEEE International Conference on Communications, ICC '09, (Jun. 14, 2009), pp. 1-5.
(Continued)

*Primary Examiner* — Linda Wong
(74) *Attorney, Agent, or Firm* — Invention Mine LLC (57) ABSTRACT

In a detection circuit, inputs correspond to received indications of vector signaling code words received by a first integrated circuit from a second integrated circuit. With four inputs, the circuit compares a first pair to obtain a first difference result and compares a second pair, disjoint from the first pair, to obtain a second difference result. The first and second difference results are then summed to form an output function. A system might use a plurality of such detection circuits to arrive at an input word. The circuit can include amplification, equalization, and input selection with efficient code word detection. The vector signaling code can be a Hadamard matrix code encoding for three input bits. The circuit might also have frequency-dependent gain, a selection function that directs one of the summation function result or the first difference result to the output function, variable gain, and/or a slicer.

20 Claims, 8 Drawing Sheets

(51) Int. Cl.
  *H04L 25/08* (2006.01)
  *H04L 25/03* (2006.01)

(56) References Cited

U.S. PATENT DOCUMENTS

| | | | |
|---|---|---|---|
| 3,939,468 | A | 2/1976 | Mastin |
| 4,163,258 | A | 7/1979 | Ebihara |
| 4,181,967 | A | 1/1980 | Nash |
| 4,206,316 | A | 6/1980 | Burnsweig |
| 4,276,543 | A | 6/1981 | Miller |
| 4,486,739 | A | 12/1984 | Franaszek |
| 4,499,550 | A | 2/1985 | Ray, III |
| 4,774,498 | A | 9/1988 | Traa |
| 4,864,303 | A | 9/1989 | Ofek |
| 4,897,657 | A | 1/1990 | Brubaker |
| 4,974,211 | A | 11/1990 | Corl |
| 5,053,974 | A | 10/1991 | Penz |
| 5,166,956 | A | 11/1992 | Baltus |
| 5,168,509 | A | 12/1992 | Nakamura |
| 5,283,761 | A | 2/1994 | Gillingham |
| 5,287,305 | A | 2/1994 | Yoshida |
| 5,412,689 | A | 5/1995 | Chan |
| 5,449,895 | A | 9/1995 | Hecht |
| 5,459,465 | A | 10/1995 | Kagey |
| 5,511,119 | A | 4/1996 | Lechleider |
| 5,553,097 | A * | 9/1996 | Dagher ............ H03M 9/00 333/129 |
| 5,599,550 | A | 2/1997 | Kohlruss |
| 5,659,353 | A | 8/1997 | Kostreski |
| 5,802,356 | A | 9/1998 | Gaskins |
| 5,825,808 | A | 10/1998 | Hershey |
| 5,875,202 | A | 2/1999 | Venters |
| 5,945,935 | A | 8/1999 | Kusumoto |
| 5,995,016 | A | 11/1999 | Perino |
| 5,999,016 | A | 12/1999 | McClintock |
| 6,005,895 | A | 12/1999 | Perino |
| 6,084,883 | A | 7/2000 | Norrell |
| 6,119,263 | A | 9/2000 | Mowbray |
| 6,172,634 | B1 | 1/2001 | Leonowich |
| 6,175,230 | B1 | 1/2001 | Hamblin |
| 6,232,908 | B1 | 5/2001 | Nakaigawa |
| 6,278,740 | B1 * | 8/2001 | Nordyke ............ H04L 5/20 327/63 |
| 6,346,907 | B1 | 2/2002 | Dacy |
| 6,359,931 | B1 | 3/2002 | Perino |
| 6,404,820 | B1 | 6/2002 | Postol |
| 6,417,737 | B1 | 7/2002 | Moloudi |
| 6,452,420 | B1 | 9/2002 | Wong |
| 6,483,828 | B1 | 11/2002 | Balachandran |
| 6,504,875 | B2 | 1/2003 | Perino |
| 6,509,773 | B2 | 1/2003 | Buchwald |
| 6,556,628 | B1 | 4/2003 | Poulton |
| 6,563,382 | B1 * | 5/2003 | Yang ............ H03F 3/45089 330/254 |
| 6,621,427 | B2 | 9/2003 | Greenstreet |
| 6,624,699 | B2 | 9/2003 | Yin |
| 6,650,638 | B1 | 11/2003 | Walker |
| 6,661,355 | B2 | 12/2003 | Cornelius |
| 6,686,879 | B2 | 2/2004 | Shattil |
| 6,766,342 | B2 | 7/2004 | Kechriotis |
| 6,839,429 | B1 | 1/2005 | Gaikwad |
| 6,839,587 | B2 | 1/2005 | Yonce |
| 6,854,030 | B2 | 2/2005 | Perino |
| 6,865,234 | B1 | 3/2005 | Agazzi |
| 6,865,236 | B1 | 3/2005 | Terry |
| 6,898,724 | B2 | 5/2005 | Chang |
| 6,927,709 | B2 | 8/2005 | Kiehl |
| 6,954,492 | B1 | 10/2005 | Williams |
| 6,963,622 | B2 | 11/2005 | Eroz |
| 6,973,613 | B2 | 12/2005 | Cypher |
| 6,976,194 | B2 | 12/2005 | Cypher |
| 6,982,954 | B2 | 1/2006 | Dhong |
| 6,990,138 | B2 | 1/2006 | Bejjani |
| 6,999,516 | B1 | 2/2006 | Rajan |
| 7,023,817 | B2 | 4/2006 | Kuffner |
| 7,053,802 | B2 | 5/2006 | Cornelius |
| 7,075,996 | B2 | 7/2006 | Simon |
| 7,085,153 | B2 | 8/2006 | Ferrant |
| 7,085,336 | B2 | 8/2006 | Lee |
| 7,130,944 | B2 | 10/2006 | Perino |
| 7,142,612 | B2 | 11/2006 | Horowitz |
| 7,142,865 | B2 | 11/2006 | Tsai |
| 7,164,631 | B2 | 1/2007 | Tateishi |
| 7,167,019 | B2 | 1/2007 | Broyde |
| 7,180,949 | B2 | 2/2007 | Kleveland |
| 7,184,483 | B2 | 2/2007 | Rajan |
| 7,269,212 | B1 | 9/2007 | Chau |
| 7,335,976 | B2 | 2/2008 | Chen |
| 7,339,990 | B2 | 3/2008 | Hidaka |
| 7,348,989 | B2 | 3/2008 | Stevens |
| 7,349,484 | B2 | 3/2008 | Stojanovic |
| 7,356,213 | B1 | 4/2008 | Cunningham |
| 7,358,869 | B1 | 4/2008 | Chiarulli |
| 7,362,130 | B2 | 4/2008 | Broyde |
| 7,370,264 | B2 | 5/2008 | Worley |
| 7,389,333 | B2 | 6/2008 | Moore |
| 7,428,273 | B2 | 9/2008 | Foster |
| 7,456,778 | B2 | 11/2008 | Werner |
| 7,462,956 | B2 | 12/2008 | Lan |
| 7,496,162 | B2 | 2/2009 | Srebranig |
| 7,535,957 | B2 | 5/2009 | Ozawa |
| 7,570,704 | B2 | 8/2009 | Nagarajan |
| 7,599,390 | B2 | 10/2009 | Pamarti |
| 7,616,075 | B2 | 11/2009 | Kushiyama |
| 7,633,850 | B2 | 12/2009 | Ahn |
| 7,639,596 | B2 | 12/2009 | Cioffi |
| 7,643,588 | B2 | 1/2010 | Visalli |
| 7,656,321 | B2 | 2/2010 | Wang |
| 7,694,204 | B2 | 4/2010 | Schmidt |
| 7,697,915 | B2 | 4/2010 | Behzad |
| 7,706,456 | B2 | 4/2010 | Laroia |
| 7,706,524 | B2 | 4/2010 | Zerbe |
| 7,746,764 | B2 | 6/2010 | Rawlins |
| 7,787,572 | B2 | 8/2010 | Scharf |
| 7,804,361 | B2 | 9/2010 | Lim |
| 7,808,883 | B2 | 10/2010 | Green |
| 7,841,909 | B2 | 11/2010 | Murray |
| 7,869,497 | B2 | 1/2011 | Benvenuto |
| 7,882,413 | B2 | 2/2011 | Chen |
| 7,899,653 | B2 | 3/2011 | Hollis |
| 7,907,676 | B2 | 3/2011 | Stojanovic |
| 7,933,770 | B2 | 4/2011 | Kruger |
| 8,036,300 | B2 | 10/2011 | Evans |
| 8,050,332 | B2 | 11/2011 | Chung |
| 8,055,095 | B2 | 11/2011 | Palotai |
| 8,064,535 | B2 | 11/2011 | Wiley |
| 8,085,172 | B2 | 12/2011 | Li |
| 8,091,006 | B2 | 1/2012 | Prasad |
| 8,106,806 | B2 | 1/2012 | Toyomura |
| 8,159,375 | B2 | 4/2012 | Abbasfar |
| 8,159,376 | B2 * | 4/2012 | Abbasfar ............ H04L 25/4908 341/58 |
| 8,180,931 | B2 | 5/2012 | Lee |
| 8,185,807 | B2 | 5/2012 | Oh |
| 8,199,849 | B2 | 6/2012 | Oh |
| 8,199,863 | B2 | 6/2012 | Chen |
| 8,218,670 | B2 | 7/2012 | AbouRjeily |
| 8,245,094 | B2 | 8/2012 | Jiang |
| 8,253,454 | B2 | 8/2012 | Lin |
| 8,279,094 | B2 | 10/2012 | Abbasfar |
| 8,295,250 | B2 | 10/2012 | Gorokhov |
| 8,310,389 | B1 | 11/2012 | Chui |
| 8,365,035 | B2 | 1/2013 | Hara |
| 8,406,315 | B2 | 3/2013 | Tsai |
| 8,429,495 | B2 | 4/2013 | Przybylski |
| 8,442,099 | B1 | 5/2013 | Sederat |
| 8,442,210 | B2 | 5/2013 | Zerbe |
| 8,443,223 | B2 | 5/2013 | Abbasfar |
| 8,451,913 | B2 | 5/2013 | Oh |
| 8,462,891 | B2 | 6/2013 | Kizer |
| 8,472,513 | B2 | 6/2013 | Malipatil |
| 8,498,344 | B2 | 7/2013 | Wilson |
| 8,498,368 | B1 | 7/2013 | Husted |
| 8,520,348 | B2 | 8/2013 | Dong |

(56) References Cited

U.S. PATENT DOCUMENTS

| | | | |
|---|---|---|---|
| 8,520,493 | B2 | 8/2013 | Goulahsen |
| 8,539,318 | B2 | 9/2013 | Cronie |
| 8,547,272 | B2 | 10/2013 | Nestler |
| 8,577,284 | B2 | 11/2013 | Seo |
| 8,578,246 | B2 | 11/2013 | Mittelholzer |
| 8,588,254 | B2 | 11/2013 | Diab |
| 8,588,280 | B2 | 11/2013 | Oh |
| 8,593,305 | B1 | 11/2013 | Tajalli |
| 8,638,241 | B2 | 1/2014 | Sudhakaran |
| 8,649,445 | B2 | 2/2014 | Cronie |
| 8,649,556 | B2 | 2/2014 | Wedge |
| 8,649,840 | B2 | 2/2014 | Sheppard, Jr. |
| 8,711,919 | B2 | 4/2014 | Kumar |
| 8,718,184 | B1 | 5/2014 | Cronie |
| 8,773,964 | B2 | 7/2014 | Hsueh |
| 8,780,687 | B2 | 7/2014 | Clausen |
| 8,782,578 | B2 | 7/2014 | Tell |
| 8,879,660 | B1 | 11/2014 | Peng |
| 8,897,134 | B2 | 11/2014 | Kern |
| 8,949,693 | B2 | 2/2015 | Ordentlich |
| 8,951,072 | B2 | 2/2015 | Hashim |
| 8,975,948 | B2 | 3/2015 | GonzalezDiaz |
| 8,989,317 | B1 | 3/2015 | Holden |
| 9,015,566 | B2 | 4/2015 | Cronie |
| 9,020,049 | B2 | 4/2015 | Schwager |
| 9,036,764 | B1 | 5/2015 | Hossain |
| 9,069,995 | B1 | 6/2015 | Cronie |
| 9,077,386 | B1 | 7/2015 | Holden |
| 9,093,791 | B2 | 7/2015 | Liang |
| 9,100,232 | B1 | 8/2015 | Hormati |
| 9,106,465 | B2 | 8/2015 | Walter |
| 9,124,557 | B2 | 9/2015 | Fox |
| 9,165,615 | B2 | 10/2015 | Amirkhany |
| 9,172,412 | B2 | 10/2015 | Kim |
| 9,197,470 | B2 | 11/2015 | Okunev |
| 9,281,785 | B2 | 3/2016 | Sjoland |
| 9,331,962 | B2 | 5/2016 | Lida |
| 9,362,974 | B2 | 6/2016 | Fox |
| 2002/0044316 | A1 | 4/2002 | Myers |
| 2002/0057592 | A1 | 5/2002 | Robb |
| 2002/0154633 | A1 | 10/2002 | Shin |
| 2003/0146783 | A1 | 8/2003 | Bandy |
| 2003/0227841 | A1* | 12/2003 | Tateishi .......... G11B 7/09 369/44.34 |
| 2005/0057379 | A1 | 3/2005 | Jansson |
| 2005/0174841 | A1 | 8/2005 | Ho |
| 2005/0213686 | A1 | 9/2005 | Love |
| 2007/0188367 | A1 | 8/2007 | Yamada |
| 2007/0263711 | A1 | 11/2007 | TheodorKramer |
| 2008/0104374 | A1 | 5/2008 | Mohamed |
| 2009/0059782 | A1 | 3/2009 | Cole |
| 2010/0046644 | A1 | 2/2010 | Mazet |
| 2010/0180143 | A1 | 7/2010 | Ware |
| 2010/0296556 | A1 | 11/2010 | Rave |
| 2011/0299555 | A1 | 12/2011 | Cronie |
| 2012/0152901 | A1 | 6/2012 | Nagorny |
| 2012/0161945 | A1 | 6/2012 | Single |
| 2013/0010892 | A1 | 1/2013 | Cronie |
| 2014/0226455 | A1 | 8/2014 | Schumacher |
| 2015/0010044 | A1 | 1/2015 | Zhang |
| 2015/0078479 | A1 | 3/2015 | Whitby-Strevens |
| 2015/0199543 | A1 | 7/2015 | Winoto |
| 2015/0333940 | A1 | 11/2015 | Shokrollahi |
| 2015/0381232 | A1 | 12/2015 | Ulrich |
| 2016/0020796 | A1 | 1/2016 | Hormati |
| 2016/0020824 | A1 | 1/2016 | Ulrich |
| 2016/0036616 | A1 | 2/2016 | Holden |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Burr, "Spherical Codes for M-ARY Code Shift Keying", University of York, Apr. 2, 1989, pp. 67-72, United Kingdom.

Cheng, W., "Memory Bus Encoding for Low Power: A Tutorial", Quality Electronic Design, IEEE, International Symposium on Mar. 26-28, 2001, pp. 199-204, Piscataway, NJ.

Clayton, P., "Introduction to Electromagnetic Compatibility", Wiley-Interscience, 2006.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Healey, A., et al., "A Comparison of 25 Gbps NRZ & PAM-4 Modulation used in Legacy & Premium Backplane Channels", DesignCon 2012, 16 pages.

International Search Report and Written Opinion for PCT/EP2011/059279 mailed Sep. 22, 2011.

International Search Report and Written Opinion for PCT/EP2011/074219 mailed Jul. 4, 2012.

International Search Report and Written Opinion for PCT/EP2012/052767 mailed May 11, 2012.

International Search Report and Written Opinion for PCT/US14/052986 mailed Nov. 24, 2014.

International Search Report and Written Opinion from PCT/US2014/034220 mailed Aug. 21, 2014.

International Search Report and Written Opinion of the International Searching Authority, mailed Jul. 14, 2011 in International Patent Application S.N. PCT/EP2011/002170, 10 pages.

International Search Report and Written Opinion of the International Searching Authority, mailed Nov. 5, 2012, in International Patent Application S.N. PCT/EP2012/052767, 7 pages.

International Search Report for PCT/US2014/053563, dated Nov. 11, 2014, 2 pages.

Notification of Transmittal of The International Search Report and The Written Opinion of The International Searching Authority, or The Declaration for PCT/EP2013/002681, dated Feb. 25, 2014, 15 pages.

Poulton, et al., "Multiwire Differential Signaling", UNC-CH Department of.Computer Science Version 1.1, Aug. 6, 2003.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Skliar et al., A Method for the Analysis of Signals: the Square-Wave Method, Mar. 2008, Revista de Matematica: Teoria y Aplicationes, pp. 109-129.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallini, L., et al., "Transmission Time Analysis for the Parallel Asynchronous Communication Scheme", IEEE Transactions on Computers, vol. 52, No. 5, May 2003, pp. 558-571.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

"Introduction to: Analog Computers and the DSPACE System," Course Material ECE 5230 Spring 2008, Utah State University, www.coursehero.com, 12 pages.

(56) References Cited

OTHER PUBLICATIONS

Counts, L., et al., "One-Chip Slide Rule Works with Logs, Antilogs for Real-Time Processing," Analog Devices Computational Products 6, Reprinted from Electronic Design, May 2, 1985, 7 pages.
Design Brief 208 Using the Anadigm Multiplier CAM, Copyright 2002 Anadigm, 6 pages.
Grahame, J., "Vintage Analog Computer Kits," posted on Aug. 25, 2006 in Classic Computing, 2 pages, http.//www.retrothing.com/2006/08/classic_analog_.html.
Jiang, A., et al., "Rank Modulation for Flash Memories", IEEE Transactions of Information Theory, Jun. 2006, vol. 55, No. 6, pp. 2659-2673.
Loh, M., et al., "A 3x9 Gb/s Shared, All-Digital CDR for High-Speed, High-Density I/O", Matthew Loh, IEEE Journal of Solid-State Circuits, Vo. 47, No. 3, Mar. 2012.
Notification of Transmittal of International Search Report and the Written Opinion of The International Searching Authority, for PCT/US2015/018363, mailed Jun. 18, 2015, 13 pages.
Notification of Transmittal of The International Search Report and The Written Opinion of the International Searching Authority, or The Declaration, dated Mar. 3, 2015, for PCT/US2014/066893, 9 pages.
Notification of Transmittal of The International Search Report and The Written Opinion of the International Searching Authority, or the Declaration, for PCT/US2014/015840, dated May 20, 2014. 11 pages.
Notification of Transmittal of The International Search Report and The Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, for PCT/US2015/037466, dated Nov. 19, 2015.
Notification of Transmittal of the International Search Report and The Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.
Oh, et al., Pseudo-Differential Vector Signaling for Noise Reduction in Single-Ended Signaling, DesignCon 2009.
Schneider, J., et al., "ELEC301 Project: Building an Analog Computer," Dec. 19, 1999, 8 pages, http://www.clear.rice.edu/elec301/Projects99/anlgcomp/.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Zouhair Ben-Neticha et al, "The 'streTched"-Golay and other codes for high-SNR finite-delay quantization of the Gaussian source at 1/2 Bit per sample, IEEE Transactions on Communications, vol. 38, No. 12 Dec. 1, 1990, pp. 2089-2093, XP000203339, ISSN: 0090-6678, DOI: 10.1109/26.64647.

\* cited by examiner

| A | B | C | D | a+c? | b+d? | c+d? | a+b? | c+b? | d+a? | $R_0$ | $R_1$ | $R_2$ |
|---|---|---|---|------|------|------|------|------|------|-------|-------|-------|
| 1 | -1/3 | -1/3 | -1/3 | 2/3 | -2/3 | -2/3 | 2/3 | -2/3 | 2/3 | 4/3 | -4/3 | -4/3 |
| -1/3 | 1 | -1/3 | -1/3 | -2/3 | 2/3 | -2/3 | 2/3 | 2/3 | -2/3 | -4/3 | -4/3 | 4/3 |
| -1/3 | -1/3 | 1 | -1/3 | 2/3 | -2/3 | 2/3 | -2/3 | 2/3 | -2/3 | 4/3 | 4/3 | 4/3 |
| -1/3 | -1/3 | -1/3 | 1 | -2/3 | 2/3 | 2/3 | -2/3 | -2/3 | 2/3 | -4/3 | 4/3 | -4/3 |
| -1 | 1/3 | 1/3 | 1/3 | -2/3 | 2/3 | 2/3 | -2/3 | 2/3 | -2/3 | -4/3 | 4/3 | 4/3 |
| 1/3 | -1 | 1/3 | 1/3 | 2/3 | -2/3 | 2/3 | -2/3 | -2/3 | 2/3 | 4/3 | 4/3 | -4/3 |
| 1/3 | 1/3 | -1 | 1/3 | -2/3 | 2/3 | -2/3 | 2/3 | -2/3 | 2/3 | -4/3 | -4/3 | -4/3 |
| 1/3 | 1/3 | 1/3 | -1 | 2/3 | -2/3 | -2/3 | 2/3 | 2/3 | -2/3 | 4/3 | -4/3 | 4/3 |

*Fig. 8*

CIRCUITS FOR EFFICIENT DETECTION OF VECTOR SIGNALING CODES FOR CHIP-TO-CHIP COMMUNICATION

CROSS REFERENCE TO RELATED APPLICATIONS

This application is a continuation of U.S. application Ser. No. 13/895,206 filed May 15, 2013, entitled "CIRCUITS FOR EFFICIENT DETECTION OF VECTOR SIGNALING CODES FOR CHIP-TO-CHIP COMMUNICATION USING SUMS OF DIFFERENCES", reference of which is hereby incorporated in its entirety.

CROSS REFERENCES

The following references are herein incorporated by reference in their entirety for all purposes:

U.S. Patent Publication No. 2011/0268225 of application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III").

U.S. patent application Ser. No. 13/463,742, filed May 3, 2012, naming Harm Cronie and Amin Shokrollahi, entitled "Finite State Encoders and Decoders for Vector Signaling Codes" (hereinafter called "Cronie IV").

U.S. patent application Ser. No. 13/844,331, filed Mar. 15, 2013, naming Harm Cronie and Brian Holden, entitled "Sorting Decoder" (hereinafter called "Cronie V".)

U.S. patent application Ser. No. 13/603,107, filed Sep. 4, 2012, naming Brian Holden and Amin Shokrollahi, entitled "Methods and Systems for Selection of Unions of Vector Signaling Codes for Power and Pin Efficient Chip-to-Chip Communication" (hereinafter "Holden I").

U.S. patent application Ser. No. 13/842,740, filed Mar. 15, 2013, naming Brian Holden, Amin Shokrollahi, and Anant Singh, entitled "Methods and Systems for Skew Tolerance in and Advanced Detectors for Vector Signaling Codes for Chip-to-Chip Communication" (hereinafter "Holden II").

TECHNICAL FIELD

The present invention relates to communications in general and in particular to the transmission of signals capable of conveying information and detection of those signals in chip-to-chip communication.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, multiple such circuits relative to ground or other common reference, or multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. Any suitable subset of a vector signaling code denotes a "subcode" of that code. Such a subcode may itself be a vector signaling code.

Some vector signaling methods are described in Cronie I, Cronie II, Cronie III, Cronie IV, and Cronie V. While non-binary vector signaling methods can provide substantial improvements regarding the tradeoff of pin efficiency, power efficiency and noise resilience as compared to traditional signaling methods, there are some applications wherein additional improvements are possible, and sometimes necessary.

BRIEF SUMMARY

In a detection circuit, inputs correspond to received indications of vector signaling code words received by a first integrated circuit from a second integrated circuit. In a preferred embodiment, the number of inputs is four and the detection circuit compares a first pair of the inputs to obtain a first difference result and compares a second pair of inputs, disjoint from the first pair of inputs, to obtain a second difference result. The first difference result and the second difference result are then summed to form an output function. A system might use a plurality of such detection circuits to arrive at an input word.

In one embodiment, each input is from the set $\{-1, -\frac{1}{3}, \frac{1}{3}, 1\}$, the vector signaling code comprises the union of all permutations of the symbol set $\{1, -\frac{1}{3}, -\frac{1}{3}, -\frac{1}{3}\}$ and all permutations of the symbol set $\{-1, \frac{1}{3}, \frac{1}{3}, \frac{1}{3}\}$, the system uses three of the detection circuits, and the eight possible vector signaling code words encode for three input bits.

In accordance with at least one embodiment of the invention, circuits and systems are described for the efficient reception and detection of vector signal coded data transmitted over physical channels such that the signals transmitted are resilient to common mode noise, do not require a common reference at the transmission and reception points, and can produce a higher pin efficiency than conventional differential signaling with relatively low power dissipation for encoding and decoding. In some embodiments, different voltage, current, etc. levels are used for signaling and more than two levels might be used, such as a ternary sparse signaling code wherein each wire signal has one of three values. The decoder can be a 4×4 Hadamard matrix decoder to decode a Hadamard matrix code with two differences/comparisons followed by a summation.

Hardware elements might be provided to provide storage for symbols of input information used for selecting code words, processing hardware to convert symbols to signals, parsing symbols into separate partitions, storing results, and providing the partitions in sequence as signals. Various embodiments are given with reference to specific hardware implementations of small area and low power dissipation. In hardware, a "function" might be implemented using specific circuit elements, active or passive, or might be implemented as a consequence of connections of a circuit interconnection. For example, a summation function might be implemented by wiring two current sources in parallel to form a three-wire junction such that the current on one wire of the connection is the sum (or inverse of the sum) of the currents on the other two wires. Alternatively, a particular circuit element could receive two physical values and output their sum.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

BRIEF DESCRIPTION OF THE DRAWINGS

Various embodiments in accordance with the present disclosure will be described with reference to the drawings. Same numbers are used throughout the disclosure and figures to reference like components and features.

DETAILED DESCRIPTION

Conventional communications systems receivers operate on individual wires or communications channels (i.e., single-ended signaling) or on pairs of wires or communications channels (i.e., differential signaling). In either case, a received signal is detected by comparison of a received value against a reference; for single-ended signaling, the reference may be a known voltage level such as ground or a calculated or predetermined offset voltage, while a differential receiver detects the signal of one wire in the pair in comparison to the signal of the other wire in the pair.

Figure 1:
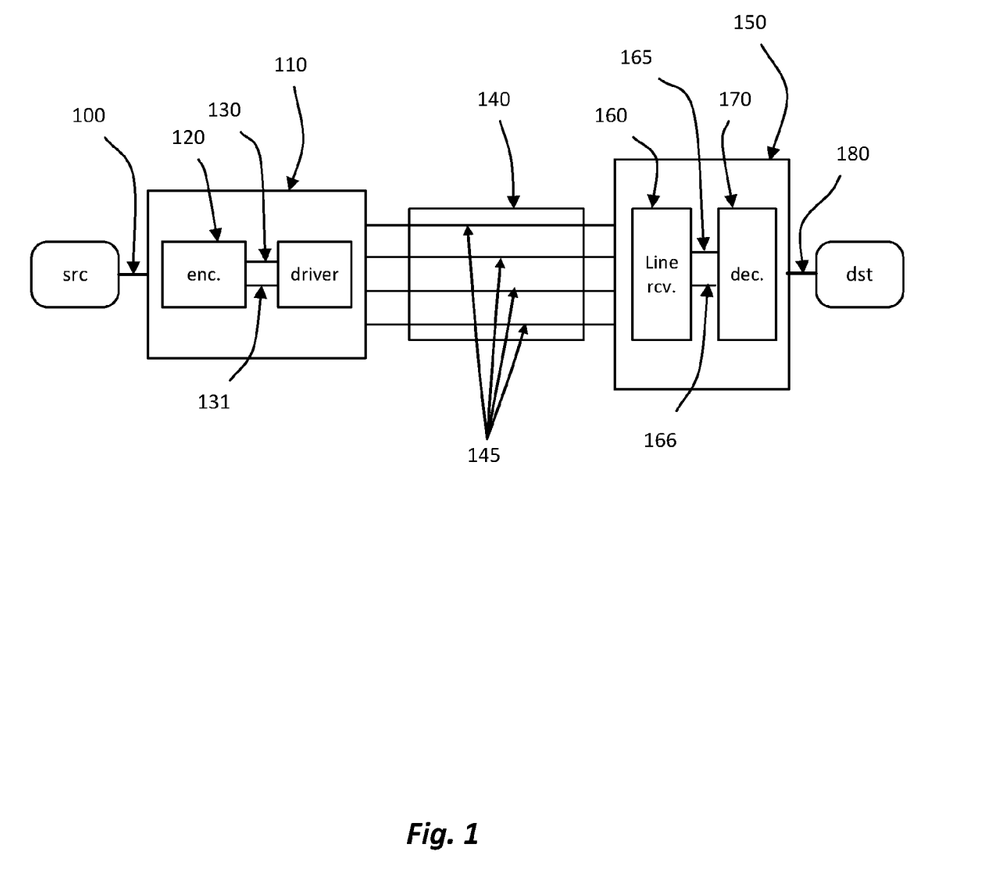
FIG. 1 is a schematic diagram that depicts aspects of an example multiple wire communications channel utilizing encoding and decoding in accordance with at least one embodiment of the invention.

Such communications channels may be extended to groups of wires carrying signals that collectively represent an encoded value. FIG. 1 is a block diagram showing communications channel 140 connecting transmitting device 110 to receiving device 150 using an example a group of four wires 145 to communicate source data 100 to destination 180 using a vector signaling code produced by encoder 120 and interpreted by decoder 170. Also shown are connectors 130, 131, line receiver 160 and connectors 165, 166.

Holden I describes an enhancement to the vector signaling code technique that makes use of the observation that the balance between complementary signals in a differential signaling channel need not be held exactly to zero. Thus, a vector signaling code may comprise the union of subcodes, each subcode being distinguishable by its unique nonzero code word sum.

Vector signaling code receivers may perform a first operation similar to that of a conventional receiver, by making a first determination of the symbol represented by the particular received signal of each wire or communications channel. However, complete detection of the vector signaling code can require identification not merely of the individual symbols of that code, but of the particular code word represented by the set of symbols communicated as a group. A vector signaling code receiver is said to "detect" vector signaling code C if for each code word c, the receiver produces a valid and unique result Sc, which may directly correspond to receive result R, or may produce R via a mapping operation.

Holden II describes the use of weighted multi-input comparators for detection of vector signaling codes. A weighted multi-input comparator with coefficients a0, a1, . . . , am−1 is a circuit that accepts as its input a vector (x0, x1, . . . , xm−1) and outputs the signals indicated in Equation 1, with the definition of the sign-function being sign(x)=+1 if x>0, sign(x)=−1 if x<0, and sign(x) is undefined if x=0.

$$\text{Output}=\text{sign}(a0*x0+\ldots+am-1*xm-1) \qquad \text{(Eqn. 1)}$$

A collection of such comparators each having distinct sets of input weights may serve as a detector for a vector signaling code.

Efficient Computational Element

In a detection circuit, inputs correspond to received indications of vector signaling code words received by a first integrated circuit from a second integrated circuit. In a preferred embodiment, the number of inputs is four and the detection circuit compares a first pair of the inputs to obtain a first difference result and compares a second pair of inputs, disjoint from the first pair of inputs, to obtain a second difference result. The first difference result and the second difference result are then summed to form an output function. A system might use a plurality of such detection circuits to arrive at an input word.

In one embodiment, each input is from the set {−1, −⅓, ⅓, 1}, the vector signaling code comprises the union of all permutations of the symbol set {1, −⅓, −⅓, −⅓} and all permutations of the symbol set {−1, ⅓, ⅓, ⅓}, the system uses three of the detection circuits, and the eight possible vector signaling code words encode for three input bits.

With the detection circuit performing differences ahead of performing summation, it becomes possible to provide for lowered distributed impedance and better high frequency response. In part, this is a result of capacitance appearing at lower impedance points rather than higher impedance points.

In accordance with at least one embodiment of the invention, a code herein referred to as "H4" is described. H4 is a balanced, non-sparse vector signaling code of four symbols, comprising the union of all permutations of the symbol set $\{1, -\frac{1}{3}, -\frac{1}{3}, -\frac{1}{3}\}$ and all permutations of the symbol set $\{-1, \frac{1}{3}, \frac{1}{3}, \frac{1}{3}\}$.

An efficient component of a detector for H4 code performs calculations of the form shown in Equation 2 where J, K, L, M are variables representing the symbol values of the four input signals values.

$$R=(J+L)-(K+M) \qquad \text{(Eqn. 2)}$$

It may be noted that applying three instances of Equation 2 with different permutations of receive signal input values to the four variables is sufficient to detect each code word of H4. As one example and without limitation, the input permutations producing the three results R0, R1, R2 based on Equations 3, 4 and 5 are sufficient to unambiguously identify each code word of vector signaling code H4 as represented by receive signal input values A, B, C, D.

$$R0=(A+C)-(B+D) \qquad \text{(Eqn. 3)}$$

$$R1=(C+D)-(A+B) \qquad \text{(Eqn. 4)}$$

$$R2=(C+B)-(D+A) \qquad \text{(Eqn. 5)}$$

Architecturally, it is convenient to perform such detection operations at or near the receiver input, and high speed capability requires an efficient, high performance embodiment.

Figure 2A:
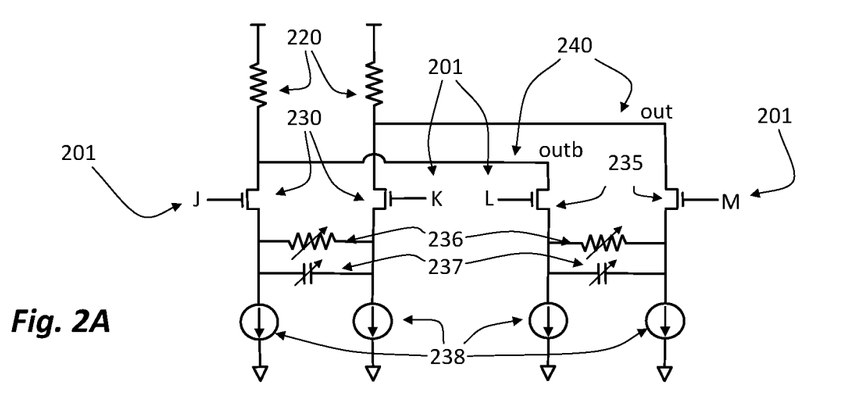
FIGS. 2A, 2B and 2C are schematic diagrams of example differential amplifier stage embodiments in accordance with the invention.

FIG. 2A is a schematic diagram of one example circuit performing the required calculation. It will be readily apparent to one familiar with the art that the difference of two sums function of Equation 2 may be regrouped using the associative rule into an equivalent form comprising a sum of two differences. These regrouped forms of Equations 3, 4, and 5 are shown as Equations 6, 7, and 8.

$$R0=(A-B)+(C-D) \qquad \text{(Eqn. 6)}$$

$$R1=(C-A)+(D-B) \qquad \text{(Eqn.7)}$$

$$R2=(C-D)+(B-A) \qquad \text{(Eqn. 8)}$$

Figure 8:
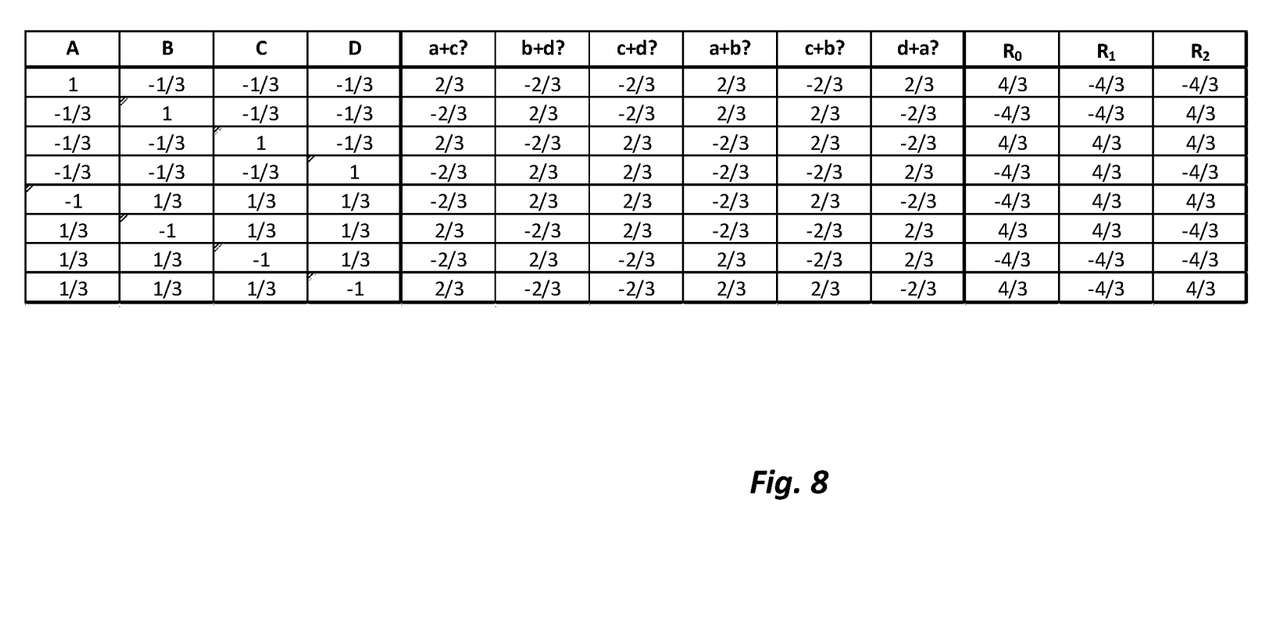
FIG. 8 is a table illustrating logical values that might appear at various points in a detector in accordance with at least one embodiment of the invention.

FIG. 8 is a table illustrating logical values that might appear at various points in a detector in accordance with at least one embodiment of the invention as represented by the equations above. It should be understood that this is but one example of an implementation or a few variations thereof.

The four circuit inputs of FIG. 2A are labeled J, K, L, M as at 201, and the inputs are gate inputs to differential transistor pairs 230 and 235, each transistor pair herein referred to as a differential amplifier. These differential amplifiers share load resistors 220 providing the necessary sum function, with the inherent differential function within each of differential amplifier 230 and 235 providing the necessary difference elements. Thus, the complimentary outputs labeled out and outb at 240 represent the result of Equation 6, as an example, based on inputs J, K, L, M. Splitting the conventional current sink per differential pair into individual per-transistor current sinks 238 allows introduction of resistors 236 and capacitors 237 that provide a frequency-dependent gain characteristic for line equalization or peaking.

Figure 2B:
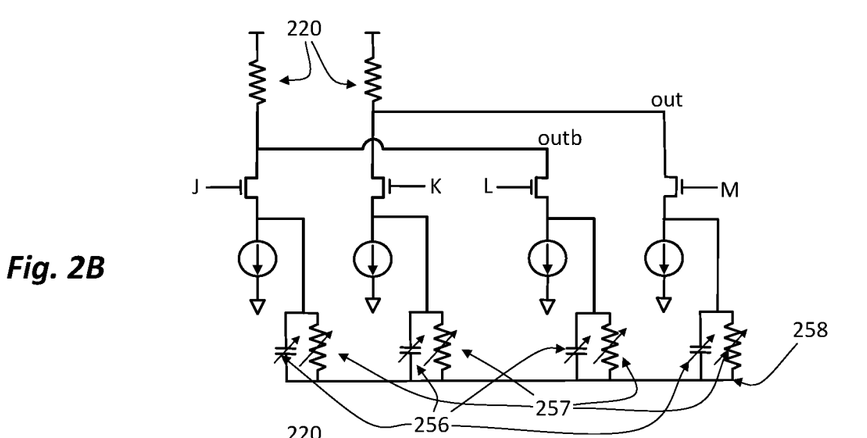

FIG. 2B is a schematic diagram of another embodiment of the invention. In this design, resistors 256 and capacitors 257 connect from the source of each transistor to a common node 258, providing a desirable frequency-dependent gain characteristic for equalization or signal peaking.

Figure 2C:
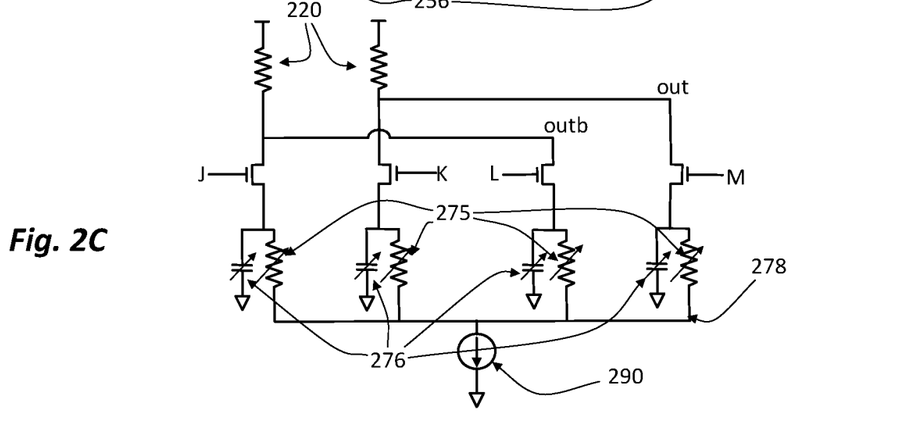

FIG. 2C is a schematic diagram of a further embodiment of the invention, where the common node 278 is used as a common connection to single current sink 290, rather than the multiple current sinks of FIG. 2B. Capacitors 276 are shown connecting between each transistor drain to ground, with capacitors 276 and resistors 275 again providing a desirable frequency-dependent gain characteristic for equalization or peaking.

It will be apparent to one skilled in the art that the functional equivalent of Equation 2, including specific examples such as illustrated by Equations. 6, 7, and 8, may be embodied by any of the circuits of FIG. 2, given an appropriate mapping of receive signal input values A, B, C, D to circuit inputs J, K, L, M. It will also be apparent that the described circuit topology may be applied to compute equivalent detection functions for codes other than the example H4 code.

In at least one embodiment of the invention as represented in each schematic of FIG. 2, one or both of the resistors and capacitors described as providing equalization or signal peaking are trimmable or variable, allowing the amplification and equalization or peaking characteristics to be adjusted. The initial value or adjusted value of the capacitors may include zero, without limitation. Load resistors 220 may be replaced by current sources, by current sources controlled by a common mode feedback, or by a combination of resistors and inductors to provide additional high-frequency peaking.

On-Chip Receive Signal Termination

At contemplated signal rates, conventional best practice might be to provide matched transmission line termination for current mode logic (CML) receive input signals. Examples in accordance with at least one embodiment of the invention are shown in FIG. 3.

Figure 3A:
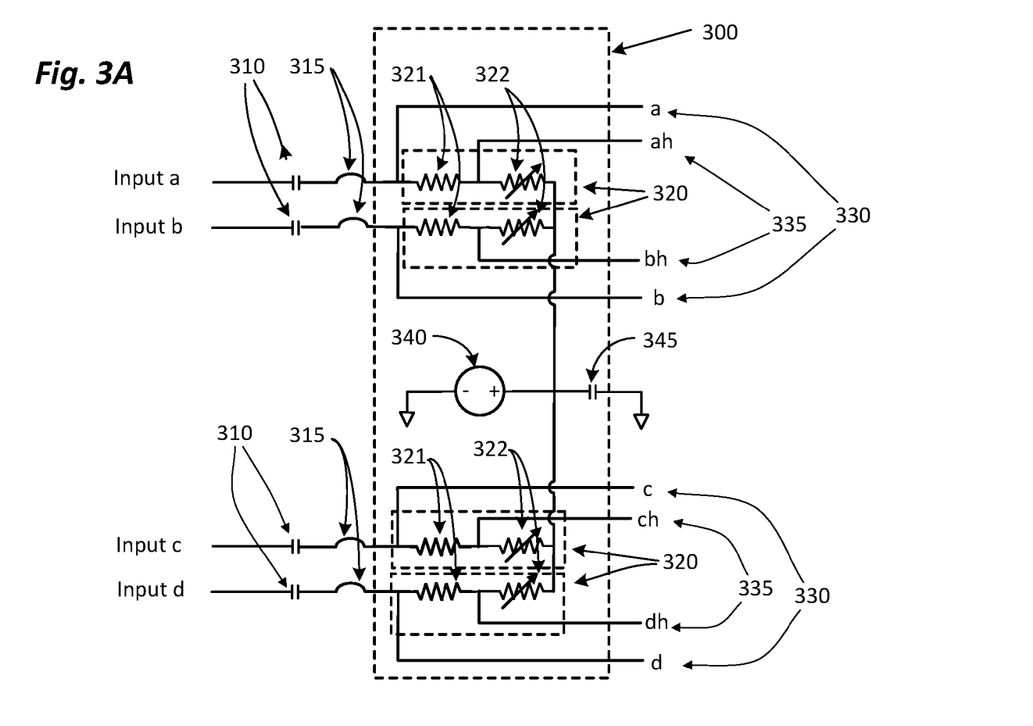
FIGS. 3A, 3B and 3C are schematic diagrams illustrating termination of receive inputs to a chip in accordance with at least one embodiment of the invention.

In FIG. 3A, signal inputs 301 labeled inputs a, b, c, and d are illustrated with external blocking capacitors 310, which optionally may be used to prevent DC current flow over the interconnection. The presence of impedance anomalies such as bond wires and bonding pads is suggested at 315, representing such known sources of signal degradation at high data rates.

In at least one embodiment, the same circuitry used for vector signaling code detection over example inputs a, b, c, d, also provides "legacy mode" support for, as an example, differential signal reception on the same inputs. Such selection of "legacy mode" may require support for greater signal level inputs (as those signals may be provided by different or earlier-generation components), and this extended-range input support may be obtained by attenuating large signal inputs before subsequent processing, as examples ah, bh, ch, dh at 335.

To provide this attenuation function, the termination resistance 320 is shown comprising components 321 and 322; as one example, they represent identical resistive values summing to the required termination impedance while also providing an attenuated output within allowable on-chip signal levels. Thus, signals 330 labeled a, b, c, d represent the full input signal level, while signals 335 labeled ah, bh, ch, dh represent, continuing the example, the same values attenuated to half amplitude. Subsequent processing circuits may select either full input signals or attenuated signals using, as an example, an analog multiplexer. The values of 321 and 322 need not be identical, and in some embodiments may be adjustable or trimmable, as illustrated by 322 of FIG. 3.

Other embodiments in accordance with the invention utilize equivalent attenuator topologies known in the art, including so-called "T" and "PI" configurations, or eschew attenuation and combine elements 321 and 322 into a single resistive termination. One alternative embodiment of termination resistance 320 is shown in FIG. 3b, where components 321 and 322 provide the desired attenuation ratio, and component 323 is trimmed or adjusted to obtain the desired termination impedance.

Figure 3B:
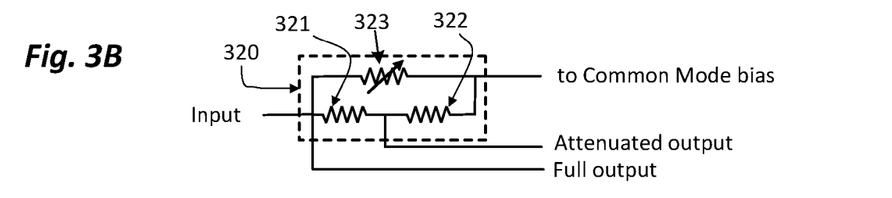

In FIGS. 3A and 3B, all terminations 320 connect to common mode bias source 340 and common mode filter capacitor 345. The bias voltage provided by source 340 to subsequent active circuits can be circuit- and process-dependent; one typical value is 600 mV.

Figure 3C:
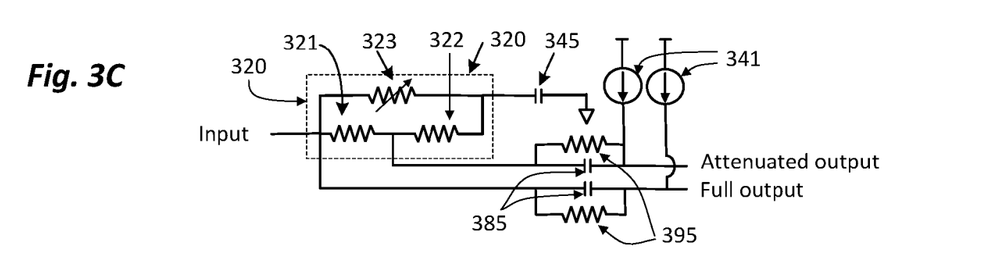

Another embodiment is illustrated in FIG. 3C, which provides level-shifting where blocking capacitor 310 is not used. Rather than utilizing a common bias source 340, the common termination node is coupled to ground via common mode filter capacitor 345, which may be shared across all terminations 320. The individual full-level and attenuated outputs are obtained through RF pass capacitors 385 and bias resistors 395, with the bias level of the receiver inputs set by current source 341 flow through the resistive path of 395 and 320.

Combined Multiplexer and Computation Element

Figure 4:
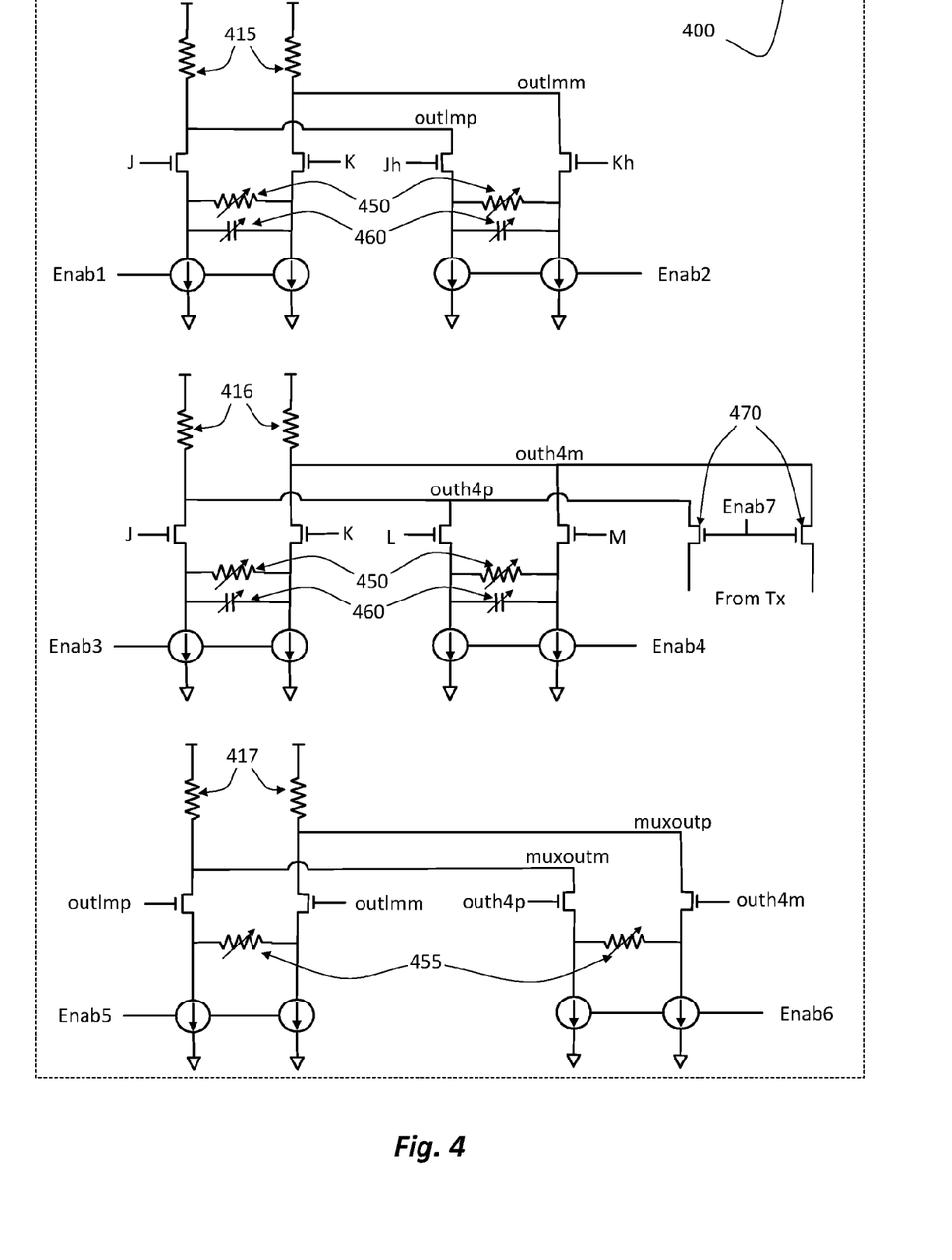
FIG. 4 is a schematic diagram of a circuit combining computation function, signal multiplexing, and adjustable gain and equalization or peaking, in accordance with at least one embodiment of the invention.

A described computational circuit of FIG. 2 may be integrated with the suggested multiplexer function, as shown in the example circuit of FIG. 4. This example comprises three components; the first selects between the difference of inputs J and K, or the difference of attenuated inputs Jh and Kh; the second performs the computation of Equation 2 on inputs J, K, L, M, or provides internal loopback of this chip's transmit signals; and the final element selects between the outputs of the first or of the second components.

This staged topology has been found to minimize loading effects, thus providing optimum performance for the given process technology. The results allow embodiment of legacy mode operation with either attenuated input signals or full level input signals, an internal signal test mode, and/or vector signaling code detection.

Selectively enabling or disabling pairs of current sinks using the control signals Enab1 through Enab6 controls the multiplexer. As examples, inputs a and b may be selected instead of inputs ah and bh by enabling current sinks using Enab1 and disabling current sinks using Enab2, and then further selected by enabling current sinks using Enab5 and disabling current sinks using Enab6 to, as an example, support a legacy mode differential receiver behavior. Conversely, selection of the computed function based on inputs a, b, c, d may be selected by enabling current sinks using Enab3 and Enab4, and further selected by disabling current sinks using Enab5 and enabling current sinks using Enab6.

One embodiment incorporates a test mode loopback of local transmit signals, which may be obtained by enabling pass transistors 470 using control signal Enab7. It will be apparent to a practitioner of the art that this multiplexer may also be used for other input selections, including alternative mappings of wire signals to computed function inputs and/or a different computed function.

Inputs to an element 400 of FIG. 4 are J, K, L, M, Jh, Lh, and the Tx signals for loopback. The final outputs of element 400 are the complimentary values muxoutp and muxoutm. Resistive and capacitive elements 450 and 460 may be incorporated as previously described to provide input gain and/or frequency-dependent equalization or peaking, and resistive elements 455 provide for controllable overall gain at the final output stage. One or more of elements 450, 455, and 460 may be trimmable or adjustable, and/or may include capacitive values of zero if no frequency dependency is desired. One or more of load resistors shown as 415, 416, and 417 may be replaced by current sources, by current sources controlled by a common mode feedback, or by a combination of a resistor and inductor to provide additional high-frequency peaking.

Figure 7:
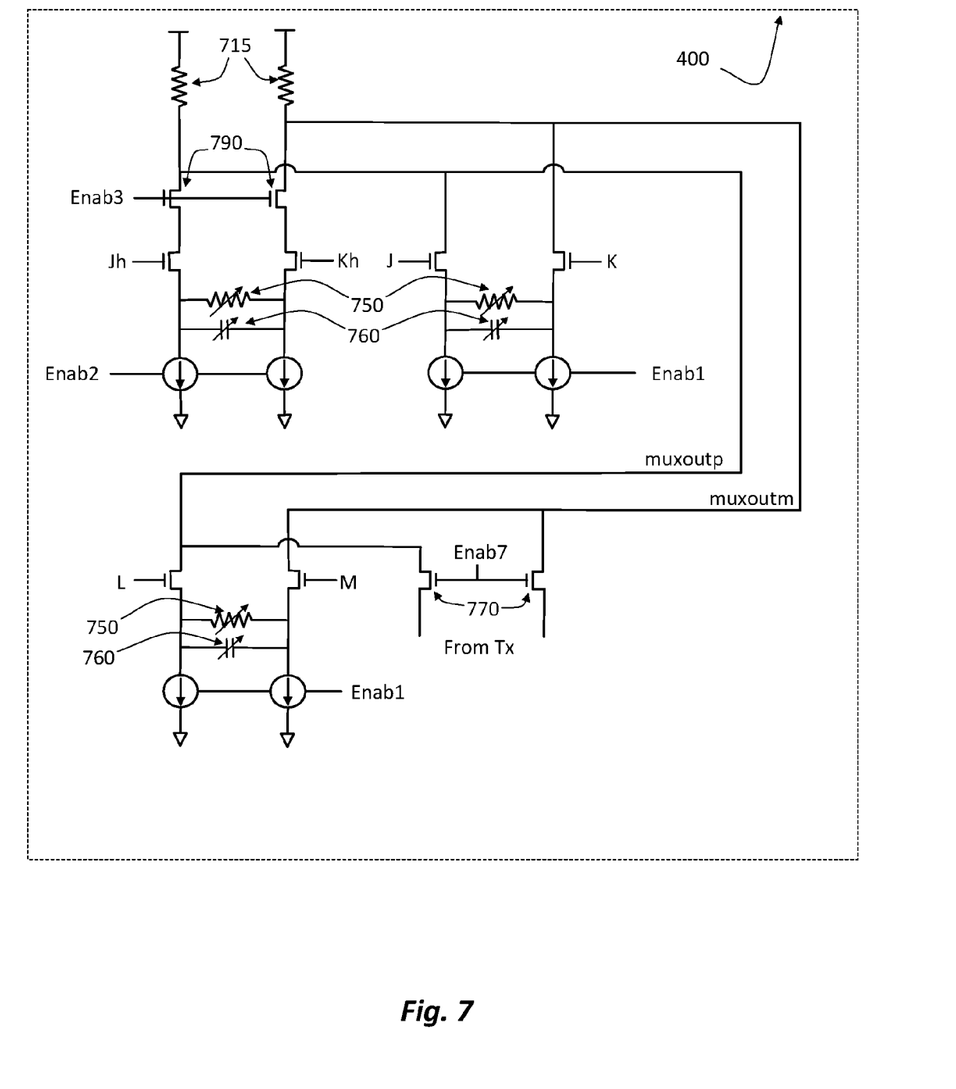
FIG. 7 is a schematic diagram of another circuit combining computation function signal multiplexing, and adjustable gain and equalization or peaking, in accordance with at least one embodiment of the invention.

An alternative embodiment of 400 is shown in FIG. 7 with all input multiplexing taking place in a single stage, rather than in the cascaded stages of FIG. 4. Cascode transistors 790 are shown as an optional addition to provide additional isolation of the half-level inputs (and their associated circuit parasitic capacitance) when not enabled by control Enab13. As with the previous example, resistors 750 and capacitors 760 may be utilized to adjust gain and/or high frequency peaking or compensation, and may be trimmable or adjustable. Load resistors 715 may also be replaced by current sources, by current sources controlled by a common mode feedback, or by a combination of resistors and inductors to provide additional high-frequency peaking.

Receive Input System for Vector Signaling Code

Figure 5:
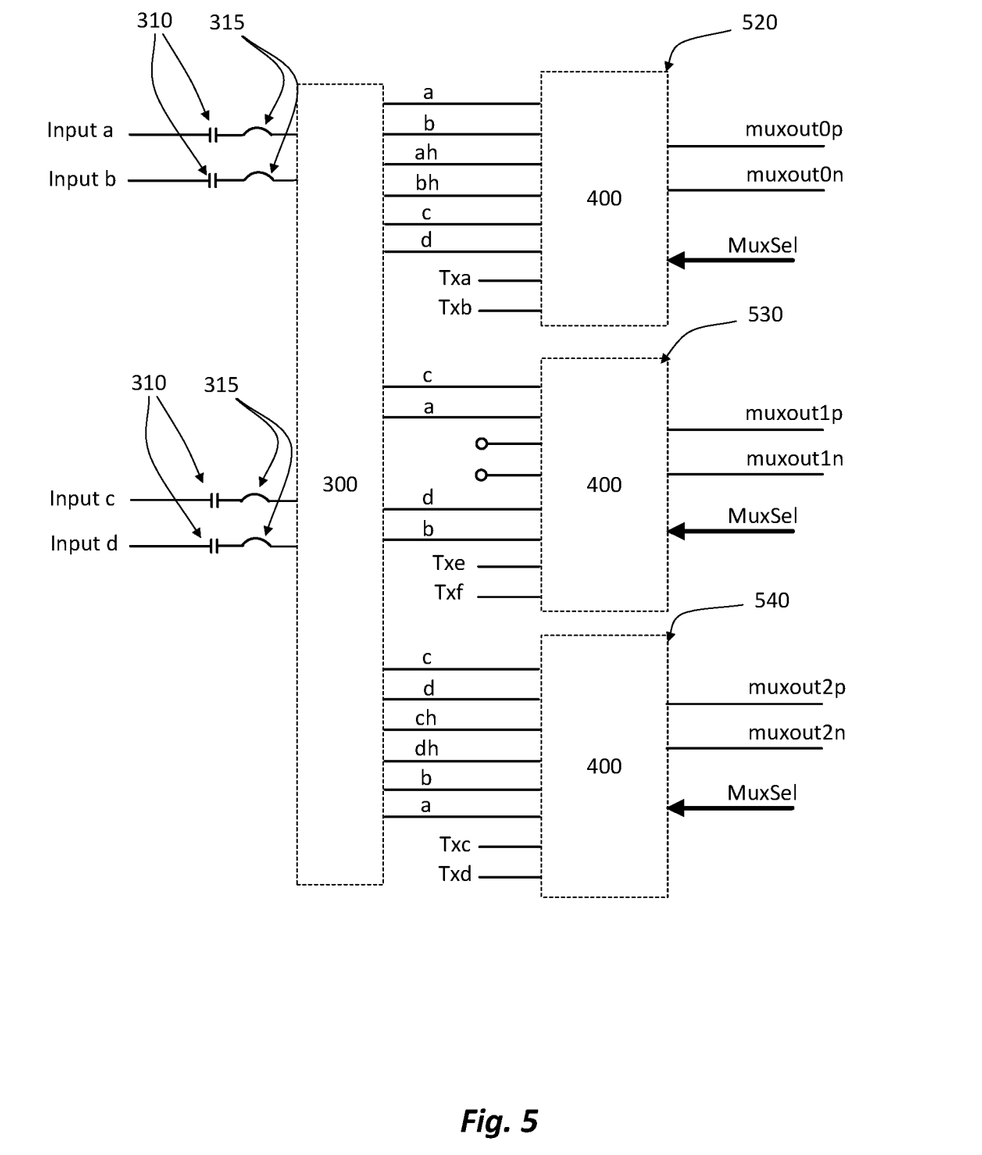
FIG. 5 is a block diagram showing use of the termination network of FIG. 3 and multiple instances of the circuit of FIG. 4 to provide a complete receive input system, in accordance with at least one embodiment of the invention.

The previously described circuits may be combined to produce a complete receive input system, as shown in the block diagram of FIG. 5. As an example, four chip-to-chip interconnection wires labeled as inputs a, b, c, d may be terminated as previously described for FIG. 3 by termination network 300.

Three instances of combined multiplexer and computation element 400 are used, each operating as previously described, e.g., for FIG. 4. The three instances of element 400 shown in FIG. 5 as 520, 530, and 540 respectively perform the computations associated with Equation 3, Equation 4, and Equation 5, based on the permutations of input signal connections shown. Under control of signals MuxSel (which within element 400 manipulate controls Enable1 through Enable7 of FIG. 4 as previously described) instance 520 may also alternatively provide a differential result of inputs a and b, a differential result of attenuated input signals ah and bh, or a loopback of internal signals Txa and Txb. Similarly, instance 540 may also alternatively provide a differential result of inputs c and d, a differential result of attenuated input signals ch and dh, or a loopback of internal signals Txc and Txd, and instance 530 may alternatively provide a loopback of internal signals Txe and Txf.

In one embodiment, the outputs of instance 530 are used only in non-legacy, non-loopback modes, thus the unused signal inputs of 530 are connected to a passive signal level such as ground. Although one familiar with the art would note that the instance of 530 could be simplified by removing unnecessary components associated with the unused functions, the amount of chip area wasted by not doing so is extremely small, while maintaining identical layouts for all instances provides consistent loading and delay characteristics throughout.

Other Variations

In at least one embodiment, all active transistor stages (e.g., of the circuit of FIG. 4 or the system of FIG. 5) are biased to be substantially in linear amplification mode. Thus, as examples, the signal outputs muxout0$p$, muxout1$p$, muxout2$p$, etc. of FIG. 5 represent analog signals, albeit ones that uniquely identify code words of the vector signaling code. Subsequent reception steps may include additional frequency- or time-domain equalization, sampling to capture particular time intervals, and slicing to obtain digital results. However, the possibility of incorporating such subsequent steps is not limiting; a minimal embodiment may utilize, as examples, simple threshold (e.g., Schmidt trigger) gates or high gain nonlinear amplifier stages to convert the outputs to digital values.

Figure 6:
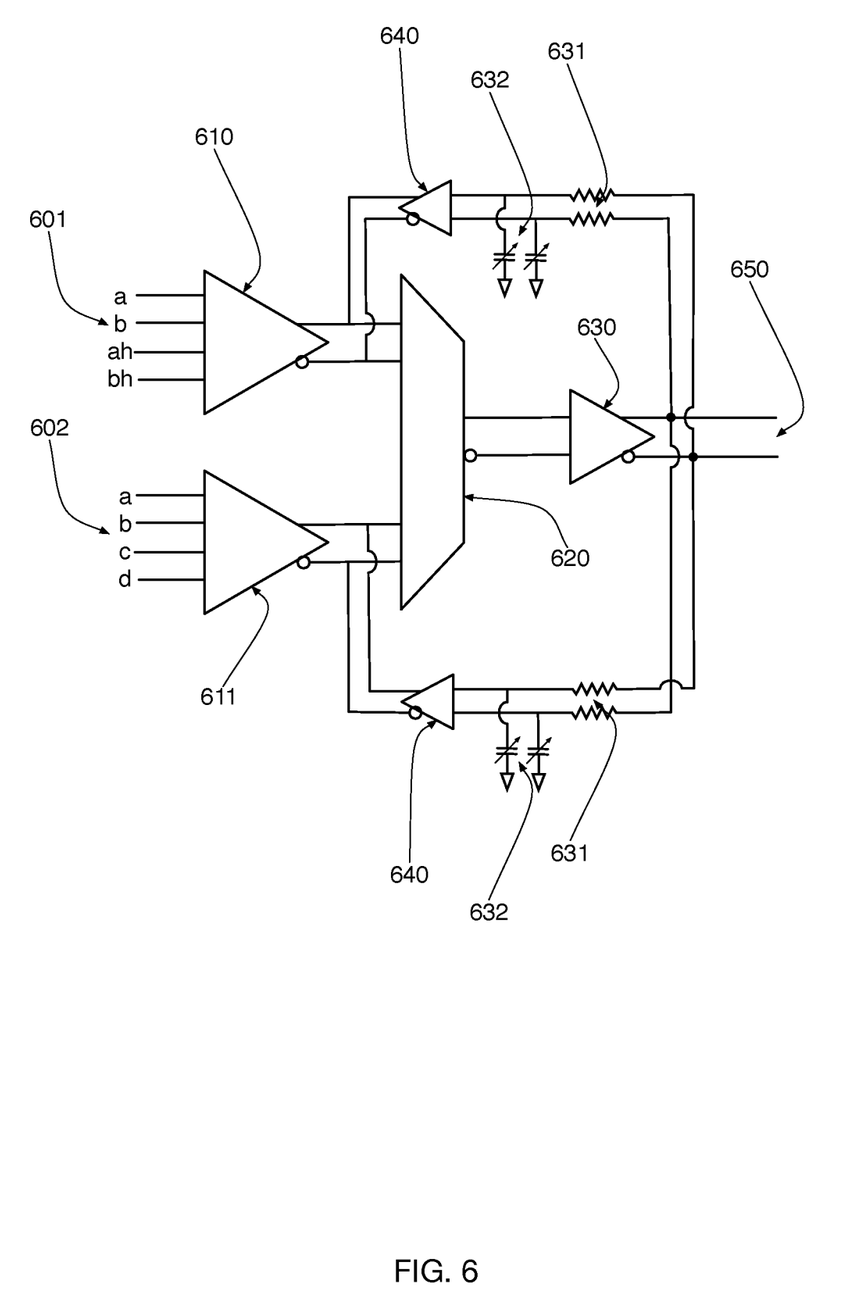
FIG. 6 is a block diagram showing use of signal feedback in accordance with at least one embodiment of the invention.

FIG. 6 provides a block diagram of another embodiment, incorporating feedback around the multiplexer and VGA stages to extend frequency response and allow greater receive bandwidth.

For purposes of illustration, the previously-described components of the receive detection system are shown in FIG. 6 as representing input/computational element 610 acting on inputs 601 and 611 acting upon inputs 602, multiplexer element 620 selecting between the input/computational elements, and output amplifier 630 producing signal outputs 650. As examples suggested by the symbols on their icons, 610 and 611 may further incorporate frequency-dependent peaking or filtering action, and 630 may further incorporate adjustable gain. Portions of outputs 650 are passed through networks comprised of resistors 631 and capacitors 632 to amplifiers 640, creating a controlled negative feedback loop that extends the linearity and bandwidth of included elements 620 and 630. As suggested by 632, elements of the feedback network may be adjustable or trimmable.

Other embodiments in accordance with the invention may interface to voltage-mode or high-impedance unterminated signal inputs, and/or communicate internal signals as voltage rather than current levels. Such embodiments may incorporate the known practice of using transmission gates as multiplexing elements.

The examples illustrate the use of vector signaling codes for point-to-point wire communications. However, this should not been seen in any way as limiting the scope of the described invention. The methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. Similarly, specific examples provided herein are for purposes of description, and do not imply a limitation.

As used herein, "physical signal" includes any suitable behavior and/or attribute of a physical phenomenon capable of conveying information. In accordance with at least one embodiment of the invention, physical signals may be tangible and non-transitory. In accordance with at least one embodiment of the invention, interpreting a set of signals as selecting an object (e.g., a data object) includes selecting the object based at least in part on the set of signals and/or one or more attributes of the set of signals. In accordance with at least one embodiment of the invention, interpreting a set of signals as representing an object (e.g., a data object) includes determining and/or selecting the object based at least in part on a representation corresponding to the set of signals. In accordance with at least one embodiment of the invention, a same set of signals may be used to select and/or determine multiple distinct objects (e.g., data objects).

What is claimed is:

1. A method comprising:
    generating a first difference signal between signals received on a first pair of selected inputs representing symbols of a codeword of an orthogonal vector signal code received via a multi-wire communication bus;
    generating a second difference signal between signals received on a second pair of selected inputs representing symbols of the codeword of the orthogonal vector signaling code received via the multi-wire communications bus, the first pair of selected inputs and the second pair of selected inputs being disjoint;
    generating a sum-of-differences output signal by combining the first difference signal and the second difference signal;
    generating a portion of a respective code identification result signal based on the sum-of-differences output signal, the code identification result signal fully identifying a set of output bits represented by the received codeword of the orthogonal vector signaling code.

2. The method of claim 1, wherein each input of the first pair of selected inputs and the second pair of selected inputs carry signals selected from a set of a high positive value, a low positive value, a low negative value, and a high negative value, representable, respectively as $\{-1, -\frac{1}{3}, \frac{1}{3}, 1\}$.

3. The method of claim 2, wherein the codeword of the orthogonal vector signaling code is a permutation of the symbol set $\{1, -\frac{1}{3}, -\frac{1}{3}, -\frac{1}{3}\}$ or a permutation of the symbol set $\{-1, \frac{1}{3}, \frac{1}{3}, \frac{1}{3}\}$.

4. The method of claim 1, wherein the first pair of inputs and the second pair of inputs collectively encode for a set of three input bits.

5. The method of claim 1, wherein the first pair of selected inputs is a pair of attenuated input signals.

6. The method of claim 1, wherein the first and second difference signals are generated using first and second differential amplifiers, respectively.

7. The method of claim 6, further comprising providing signal equalization or signal peaking using first and second frequency-dependent gain circuits connected to the first and second differential amplifiers, respectively.

8. The method of claim 1, further comprising selecting between a pair of un-attenuated inputs and a pair of attenuated inputs as the first pair of selected inputs.

9. The method of claim 1, wherein generating the portion of the result-identification signal comprises slicing the sum-of-differences output signal.

10. The method of claim 9, wherein slicing the sum-of-differences output signal comprises using a threshold gate.

11. The method of claim 10, wherein the threshold gate is a Schmidt trigger.

12. The method of claim 10, further comprising sampling the sliced portion of the result-identification signal.

13. A method comprising:
    generating a plurality of pairs of difference signals, wherein a given pair of difference signals is generated based on differences between corresponding first and second pairs of selected input signals representing symbols of a received codeword of an orthogonal vector signaling code, wherein the corresponding first and second pairs of selected input signals are disjoint;
    generating a plurality of sum-of-differences signals, wherein a given sum-of-differences signal is generated by summing a corresponding pair of difference signals of the plurality of pairs of difference signals; and
    generating portions of a code-identification result signal based on the plurality of sum-of-differences signals, each portion generated according to a respective sum-of-differences signal, wherein the result-identification signal fully identifies a plurality of output bits associated with the received codeword.

14. The method of claim 13, further comprising generating the plurality of output bits by decoding the code-identification result signal.

15. The method of claim 13, wherein the corresponding pair of selected input signals carry signals selected from a set of a high positive value, a low positive value, a low negative value, and a high negative value, representable, respectively as $\{-1, -\frac{1}{3}, \frac{1}{3}, 1\}$.

16. The method of claim 15, wherein the received codeword of the orthogonal vector signaling code is a permutation of the symbol set $\{1, -\frac{1}{3}, -\frac{1}{3}, -\frac{1}{3}\}$ or a permutation of the symbol set $\{-1, \frac{1}{3}, \frac{1}{3}, \frac{1}{3}\}$.

17. The method of claim 13, wherein four symbols of the received codeword collectively encode for a set of three input bits.

18. The method of claim 13, wherein generating the portions of the code-identification result signal comprises slicing the plurality of sum-of-differences signals.

19. The method of claim 18, wherein slicing the plurality of sum-of-difference signals comprises using a plurality of threshold gates.

20. The method of claim 18, further comprising sampling the sliced portions of the code-identification result signal.

* * * * *